United States Patent [19]

Eilertsen et al.

[11] Patent Number: 4,902,567

[45] Date of Patent: Feb. 20, 1990

[54] ELECTROLUMINESCENT LAMP DEVICES USING MONOLAYERS OF ELECTROLUMINESCENT MATERIALS

[75] Inventors: Edward T. Eilertsen, Corinth, Vt.; Gordon R. Fleming, Hanover, N.H.

[73] Assignee: Loctite Luminescent Systems, Inc., Lebanon, N.H.

[21] Appl. No.: 139,980

[22] Filed: Dec. 31, 1987

[51] Int. Cl.$^4$ ........................ H05B 33/12; B32B 17/06

[52] U.S. Cl. .................................... 428/328; 428/690; 428/917; 313/503; 313/506

[58] Field of Search ................ 313/503, 506; 428/690, 428/691, 917, 328

[56] References Cited

U.S. PATENT DOCUMENTS

| | | | |
|---|---|---|---|
| 4,143,297 | 3/1979 | Fischer | 313/503 X |
| 4,608,308 | 8/1986 | Igarashi et al. | 428/690 X |
| 4,661,373 | 4/1987 | Kato et al. | 313/503 X |
| 4,767,679 | 8/1988 | Kawachi | 313/503 X |

FOREIGN PATENT DOCUMENTS 30530 12/1962 Japan .

OTHER PUBLICATIONS

G. Destriau, "The New Phenomenon of Electrophotoluminescence . . . Lattice" in *Philowophical Magazine* vol. 38 (1946/1947).

*Primary Examiner*—Nancy A. B. Swisher
*Attorney, Agent, or Firm*—Robert F. O'Connell

[57] ABSTRACT

An electroluminescent (EL) lamp element and a process for making same. The EL lamp element has a monolayer of phosphor particles deposited in a resin binder material. The sizes of the particles are controllably pre-selected to lie within a selected range thereof. The thickness of the resin binder layer is about one-half that of the average particle size so that the tendency of the resin to migrate through the particles and to cover the surfaces of the particles is prevented. A second resin binder layer is then deposited over the exposed surfaces of phosphor particles to form a relatively thin monolayer of particles uniformly distributed in the resin binder layers. If desired, the particles can be coated with a colloidal silica material to prevent any agglomeration thereof when depositing them in the resin binder layer.

13 Claims, 1 Drawing Sheet

ELECTROLUMINESCENT LAMP DEVICES USING MONOLAYERS OF ELECTROLUMINESCENT MATERIALS

INTRODUCTION

This invention relates generally to electroluminescent lamp devices and, more particularly, to such devices which use a substantially single layer, or monolayer, of specially treated particles of electroluminescent material the sizes of which are selected to optimize the luminous efficiency and uniformity in brightness of the lamp in accordance with electric field conditions which are to be applied thereto.

BACKGROUND OF THE INVENTION

Electroluminescent lamp devices utilize electroluminescent emitting phosphor materials which produce light when a suitable AC electric field is applied thereto. Various structures of, and methods for fabricating, such devices are known to the art. In a typical device, for example, a glass or plastic substrate is coated with a transparent or translucent conducting film. Exemplary films include thin metallic layers, such as gold or silver, or certain semiconducting oxides, such as stannic oxide, which may be doped with antimony, or indium oxide doped with tin. A layer comprising an electroluminescent phosphor, such as zinc sulfide doped with copper and dispersed in a polymeric binder, is then deposited on such film. One or more dielectric layers, such as a barium titanate pigment dispersed in a polymeric binder, or unpigmented resins are commonly used for this purpose. Finally, a conductive metallic layer, such as silver paint or vacuum deposited aluminum, is applied to such structure to form the device. In alternative embodiments such layers may be applied in reverse order and, in such cases, the substrate is commonly aluminum foil.

One technique for depositing such electroluminescent phosphor layer is to deposit such phosphor in a purely random fashion, such as by screen printing, spraying or doctor blade coating techniques.

Although useful electroluminescent lamp devices can be fabricated using such randomly deposited phosphors, such devices often have undesirable properties which arise from particle agglomeration or clustering and as a result of the mixing and coating processes. Thus, the phosphor particles often have such masses that they settle out of solution and such settling action, for example, produces a sparse phosphor population density in some regions or variations in population density from region to region arising from the mixing and coating operations, some regions, for example, containing much thicker phosphor particle layers due to the particle agglomeration. Accordingly, a substantially non-uniform particle distribution exists throughout the mixture and often many, sometime relatively large, regions thereof are completely void of phosphor particles. The resultant coating thereof, when viewed in cross section, is seen to be highly non-uniform in thickness. When an electrode material is deposited onto such structure the electrode layer has non-uniform surface characteristics. When an AC electric field is applied thereto, a substantially non-uniform electric field is produced across the structure and results in both luminous inefficiency in the operation of the device and substantial non-uniformity in brightness over the surface thereof.

Other methods of depositing the electroluminescent phosphor layer attempt to do so in a controlled, non-random, manner usually aimed at producing a single layer, or monolayer, of phosphor particles as by using dusting techniques. Such a method has been described, for example, in the article "The New Phenomenon of Electroluminescence and Its Possibilities for Investigation of Crystal Lattice", G. Destriau, *Philosoohical Mag.*, Vol. 38, (1946/1947).

A similar approach has been described more recently in Japanese Publication No. 27660/1965, Dec. 7, 1965, of Nippon Columbia Co., Ltd. Such publication discloses the use of a thin and uniform fluorescent substrate layer in which the fluorescent powder is arranged nearly in one line and one layer. The layer is formed by applying powdered fluorescent particles to a layer of a high molecular dielectric substance having adhesive properties. The latter layer is used to coat a conductive glass. The fluorescent powder is then pressed down into the dielectric so as to cut into the dielectric layer to form a layer of fluorescent powder generally at the lowest level of the dielectric. The powder forms effectively only one line and one layer thereof and excess fluorescent powder is then removed. The adhesive property of the dielectric is stabilized by curing a further layer, such as a solution of acetone and cyano cellulose, which is applied over the fluorescent powder/-dielectric layer. Following drying thereof a conductive electrode layer is deposited thereon.

In practicing such monolayer formation techniques, practical problems are encountered which generally have prevented the realization of the intended benefits thereof. Much of the difficulty is due to the process of working the phosphor particles without any further treatment thereof to render it amenable to a dusting process. Since such particles retain a tendency to agglomerate and form clumps or clusters thereof, there is a tendency not to be able to form an effective monolayer. Furthermore, such phosphor layer contains a broad distribution of particle sizes and produces a device which does not exhibit a desired high level of luminous efficiency and a desired uniformity in brightness as is usually required in practical applications. Moreover, when the fluorescent powder is pressed down into the dielectric layer, phosphor particles are frequently brought into contact with the bottom conductive layer and produces electrical problems, i.e., electrical short circuiting.

BRIEF SUMMARY OF THE INVENTION

The structure of the invention and the process used to make such structure tend to overcome the above disadvantages which result from using either random techniques for depositing phosphor particle layers or from using the non-random monolayer techniques discussed above. In accordance with the invention, an electroluminescent lamp element has deposited thereon a substantially single layer, or monolayer, of phosphor particles substantially uniformly distributed in a resin binder layer so as to be substantially uniformly distributed within the electric field applied thereto.

In the fabrication process the phosphor particles are pre-classified so as to provide particles the sizes of which are controllably selected to lie within a relatively narrow distribution range of particle sizes. Such pre-classified particles are applied by using suitable coating techniques such as cascading, electrostatic spraying, fluidized bed, silk screening or mechanical impingement techniques which can controllably deposit a substantially uniform layer of such controllably sized particles onto the substrate. The phosphor particles provide a layer which has essentially a uniform thickness effectively equivalent to the average particle thickness and a substantially uniform area density throughout the entire surface without the agglomeration problems normally encountered using prior techniques.

The pre-classification of such particles can be performed so as to provide particles in various different and relatively narrow size ranges. The selection of a particular range of sizes together with the use thereof in forming a monolayer of phosphor particles permits an electroluminescent element to be specifically designed for varying electric field strengths which in particular applications ar selected to satisfy known drive conditions so as to produce optimum brightness and luminous efficiency.

Such device assures uniformity in the electric field which is to be applied across the device and tends to maximize the electroluminescent sites per unit area over the surface of the device, thereby increasing the overall luminous efficiency and uniformity of appearance, as well as the overall brightness thereof. Further, by avoiding the use of multiple or clustered layers of phosphor particles, there is an elimination of the disadvantages which arise because of the phosphor-over-phospho interfaces which are normally present in many such devices and which adversely affect the efficiency, brightness and uniformity of the illumination that is produced.

DESCRIPTION OF THE DRAWINGS

The invention can be described in more detail with the help of the accompanying drawings wherein.

Figure 1:
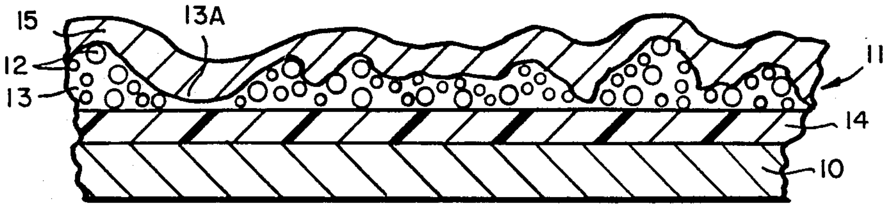
FIG. 1 PRIOR ART
FIG. 1 shows a view in cross section of a portion of a typical electroluminescent layered structural element for use in an electroluminescent lamp device as used in the prior art.

As can be seen in FIG. 1, a typical structure of the prior art comprises a layer 10 of aluminum foil having a thickness lying within a range from 0.0005–0.005 inches. A barium titanate dielectric coating 14 is deposited over the aluminum foil surface. A mixture 11 comprising electroluminescent phosphor particles 12 dispersed in a resin binder 13 is applied to the surface of the dielectric layer 14. The phosphor particles tend to agglomerate and form clusters thereof, the particles thereby lying on top of one another so as to produce multi-layers of such particles, the thicknesses thereof varying and being equivalent to many particle diameters. Such particle agglomerate regions are often non-uniformly dispersed throughout binder 13 so that the thickness of the particle layer varies across the overall surface of the dielectric layer and, in some cases, certain regions 13A thereof ma be completely void of phosphor particles. An electrode layer 15 is deposited over painted layer 11, layer 15 having relatively highly non-uniform surface characteristics as shown.

Figure 2:
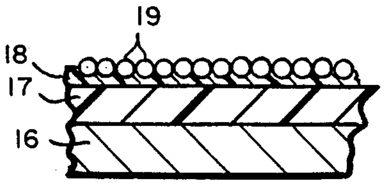
FIG. 2 shows a view in cross section of a portion of an electroluminescent structural element in accordance with the invention.

FIG. 2 shows a portion of a layered electroluminescent element in accordance with the invention in which a layer 16 of aluminum foil has deposited on a surface thereof a layer 17 of a dielectric material. It has been found that a material having a relatively high dielectric constant, e.g., a barium titanate pigment dispersed in a binder material, is often preferable in order to enhance the brightness of the electroluminescence, particularly when using relatively low voltages of excitation for the luminescent material. A layer 18 of a resin binder material preferably with a high dielectric constant is deposited on dielectric layer 17 and a substantially single layer, or monolayer, 19 of phosphor particles is uniformly deposited onto the resin binder layer 18. The thickness of the binder layer is less than, and preferably about one-half of, the average thickness, or diameter, of the phosphor particles, as shown, although the binder layer thickness may in some cases range from as low as one-quarter to as high as three-quarters of the average thickness of the phosphor particles. There should be enough binder to retain the phosphor particles but not enough to migrate to any significant extent between particles and cover the exposed particle surfaces. The selected average particle size will depend upon the application desired, e.g., in terms of the brightness level and the operating conditions expected to be used, e.g., the electric field strengths which are to be used to activate the electroluminescent material. Thus the top surfaces of the phosphor particles of the monolayer of particles are generally not covered with the resin binder material and remain exposed.

The resin binder layer 18 can be applied to the dielectric/aluminum foil element by using suitable machine coating or silk screening techniques known to the art, the thickness thereof being controlled so as to be substantially uniform in nature over the entire surface and to lie within the above discussed desired thickness range.

Before being deposited, the phosphor particles are classified using well known size classification techniques so that their sizes, e.g., effectively the diameters of generally spherical or spherical-like particles, are less than a pre-selected size range so that the particle size distribution lies within a selected relatively narrow range of particle sizes. The particles are then controllably applied to the resin binder layer by using well-known cascading, silk screening, fluidized bed, electrostatic spraying or mechanical impingement techniques so that a substantially uniform and dense monolayer 19 thereof is attached to the resin binder layer 18. The phosphor particle/resin binder combination is cured using well known curing techniques, such as by evaporation or by chemical reaction.

Figure 3:
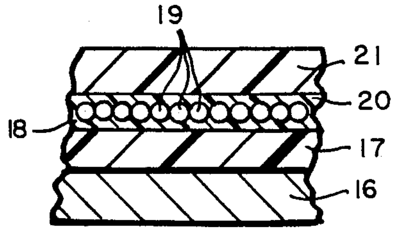
FIG. 3 shows a view in cross section of an electroluminescent element of the invention which includes the portion depicted in FIG. 1.

As shown in FIG. 3, a further layer 20 of resin binder is applied over the dried phosphor/binder layer in a substantially uniform coating to a selected thickness which depends upon the desired future use for the electroluminescent lamp in which the element is to be used. The layer 20 is applied by using suitable machine coating or silk screening techniques, and again is cured, for example, by suitable solvent evaporation or chemical reaction. An electrode layer 21 is then deposited on the layer 20 and has substantially uniform surface characteristics as shown. The overall structure shown in FIG. 3 is then ready for use in an electroluminescent (EL) lamp device using well known EL lamp formation techniques.

The use of substantially a single layer of phosphor particles having sizes controllably selected to lie within a selected range thereof and uniformly distributed within layers 18 and 20 provides a lamp element with higher luminous efficiency and generally brighter illumination substantially uniformly over the entire lamp emitting region than devices of the prior art using multilayer particle structures or devices using a monolayer of particles having non-selected or random sizes, which lie in a wide range thereof, as discussed above. The brightness of the electroluminescence achieved can be varied by varying the overall thickness of the binder/particle layers 18, 19, 20 and by appropriate selection of the particle sizes. Normally, the smaller the particles the greater the brightness and the shorter the life of the lamp, while the use of larger particles tends to reduce the brightness and provide longer life. Moreover, the quality of EL lamp devices produced by the invention on a production basis can be maintained to a greater degree than when using such previous lamp forming techniques.

In some cases where it is suspected that the phosphor particles have characteristics that might cause them to agglomerate or cluster, e.g., the particles may be in a slightly moistened state, the particles can be pre-treated before applying them to the resin binder to assured that the tendency to agglomerate will be avoided. One effective pre-treatment technique found helpful in this regard, for example, is to coat the particles with a suitable material, such as a colloidal silica material, which prevents the clustering thereof. A particular material useful for this purpose is available under the trade name "Ludox" from E. I. duPont de Nemours Company of Wilmington, Del. When so treated the tendency to agglomerate to any degree is effectively eliminated.

While the above embodiment of the invention describes a preferred embodiment thereof, modifications may occur to those in the art within the spirit and scope of the invention. Hence, the invention is not to be limited to the specific embodiment discussed except as defined by the appended claims.

What is claimed is:

1. An electroluminescent lamp element comprising a layer of phosphor particles retained in a binder material in a substantially uniform monolayer arrangement to form a luminescent means, the sizes of said particles being controllably pre-selected, in accordance with the electric field strength which is to be used to activate said luminescent means, to lie within a selected range of sizes so as to produce a high luminous efficiency, said layer being insulatively coupled to electrode means.

2. An electroluminescent lamp element in accordance with claim 1 wherein said electrode means includes a first layer of electrically conductive material forming a first electrode and said layer of phosphor particles in said binder is insulatively coupled to said first layer by a layer of dielectric material deposited on said first conductive layer;

said binder material includes a first layer of a binder material deposited on said dielectric layer, said monolayer of phosphor particles being retained in said first layer of binder material; and a second layer of binder material deposited on said monolayer of phosphor particles; and a second layer of electrically conductive material deposited on said second layer of binder material forming a second electrode of said electrode means.

3. An electroluminescent lamp element in accordance with claim 2 wherein the thickness of said first layer of binder material is selected so that the phosphor particles are adequately retained therein and the binder material does not migrate substantially between, and cover the surfaces of, said particles.

4. An electroluminescent lamp element in accordance with claim 3 wherein the thickness of said first layer of binder material is about one-quarter to about three-quarters of the average size of said particles.

5. An electroluminescent lamp element in accordance with claim 4 wherein said thickness is about one-half the average size of said particles.

6. An electroluminescent lamp element in accordance with claim 2 wherein said binder material is a resin binder material.

7. An electroluminescent lamp element in accordance with claim 2 wherein said dielectric material is barium titanate.

8. An electroluminescent lamp element in accordance with claim 2 wherein said phosphor particles are coated with a coating material for preventing the agglomeration thereof.

9. An electroluminescent lamp element in accordance with claim 8 wherein said coating material is a colloidal silica material.

10. An electroluminescent lamp element in accordance with claim 9 wherein said colloidal silica material is Lubox material.

11. An electroluminescent lamp element in accordance with claim 1 wherein the sizes of said particles are selected in accordance with the operating conditions in which the lamp element is to be used.

12. An electroluminescent lamp element in accordance with claim 11 wherein the sizes of said particles are selected in accordance with the electric field strength which is to be used to activate said luminescent means.

13. An electroluminscent lamp element in accordance with claim 10 wherein the thickness of the layer of phosphor particles in said binder is selected to produce a selected brightness of the electroluminescence produced by said lamp element.

* * * * *